United States Patent Office 3,580,965
Patented May 25, 1971

3,580,965
THERMOPLASTIC POLYESTER MOLDING
COMPOSITIONS CONTAINING OLEFIN-
VINYL ESTER COPOLYMERS
Ludwig Brinkmann, Frankfurt am Main, Harald Cherdron, Wiesbaden, and Walter Herwig, Frankfurt am Main, Germany, assignors to Farbwerke Hoechst Aktiengesellschaft vormals Meister Lucius & Bruning, Frankfurt am Main, Germany
No Drawing. Filed July 11, 1968, Ser. No. 743,946
Claims priority, application Germany, July 18, 1967, F 52,991
Int. Cl. C08g 39/04
U.S. Cl. 260—873       11 Claims

ABSTRACT OF THE DISCLOSURE

Molding compositions which can be processed thermoplastically are prepared from a mixture of linear saturated polyesters and α-olefin-vinyl ester copolymers and are distinguished by a high impact strength.

---

The present invention provides thermoplastic molding compositions of polyesters.

It is known to process polyester molding compositions containing linear saturated polyesters of aromatic dicarboxylic acids into crystalline shaped articles. For example polyethylene terephthalate can be injection-molded to give shaped articles whose speed of crystallisation and degree of crystallisation can be influenced by the addition of suitable nucleating agents. The shaped articles thus obtained possess a moderate impact strength.

It is also known to admix polypropylene or poly-4-methylpentene-1 to polyethylene terephthalate. Molding compositions having improved dimensional stability are thereby obtained.

Thermoplastic molding compositions have now been found consisting of a mixture of (a) linear saturated polyesters of aromatic dicarboxylic acids and optionally of small quantities of aliphatic dicarboxylic acids and satuarted aliphatic or cycloaliphatic diols, and
(b) copolymers of α-olefins and vinyl esters of saturated aliphatic monocarboxylic acids, wherein the amount of the copolymers according to (b) is 0.05 to 20, preferably 0.5 to 10% by weight relative to the total mixture.

It is surprising that the mixtures according to the invention, whilst having good hardness, abrasion resistance and solvent resistance, show a significantly increased impact strength.

Polyethylene glycol terephthalate is preferably used as the linear saturated polyester of aromatic dicarboxylic acids. The polyester has a reduced specific viscosity of between 0.6 and 2.0 dl./g., preferably between 0.9 to 1.6 dl./g., measured in a 1% strength solution in benzenetetrachlorethane, 60:40, at 25° C. It is also possible to employ a polyester of lower reduced viscosity and to bring it to the desired higher viscosity by post-condensation over the course of the mixing process. It is also possible to use other polyesters, for example polycyclohexane-1,4-dimethylol terephthalate. It is also possible to use modified polyethylene glycol terephthalates which in addition to terephthalic acid contain further aromatic, or also aliphatic, dicarboxylic acids, for example naphthalene-2,6-dicarboxylic acid or adipic acids, as basic units. Furthermore it is possible to employ modified polyethylene glycol terephthalates which in addition to ethylene glycol further contain other aliphatic diols as alcohol components, such as for example neopentyl glycol or butanediol-1,4 or cycloaliphatic diols, such as 1,4-dimethylol-cyclohexane.

Numerous copolymers may be used as copolymers of α-olefins with vinyl esters of saturated aliphatic monocarboxylic acids. Preferred products are copolymers of ethylene with vinyl acetate with ethylene contents of between 30 and 99, preferably 50 to 75% by weight, having average molecular weights (for example $\overline{Mw}$) of 10,000 to 500,00 preferably 50,000 to 300,000. They are obtained according to known methods. The compounds of the following general structure

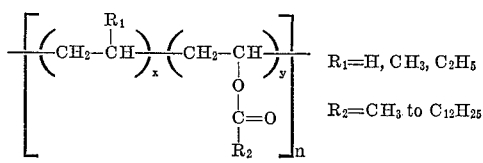

wherein $x$, $y$ and $n$ represent integers, are preferentially suitable. Such compounds are copolymers of alpha-olefins having 2 to 4 carbon atoms and vinyl esters of saturated aliphatic monocarboxylic acids having 2 to 13 carbon atoms.

The polyester molding compositions of the invention contain 0.05 to 20% by weight, preferably 0.5 to 10% by weight, of the copolymers of α-olefins with vinyl esters.

The admixture of the α-olefin-vinyl ester copolymer, designated below as copolymer, to the polyester composition can be effected in various ways, with the procedures according to (a) and (b) being preferred.

(a) The polyester is fused and optionally post-condensed to the desired viscosity in the melt in vacuo. The copolymer is then added and intensively stirred in, appropriately under nitrogen. The melt is optionally further stirred in vacuo until homogeneous mixing has taken place.

(b) The polyester granules or polyester powder is mixed as uniformly as possible with the copolymer, fused in the extruder, extruded whilst cooling and granulated.

(c) The polyester granules are mixed with the fused copolymer at an elevated temperature in a rotating vessel and are allowed to cool whilst continuing rolling. Mixing is effected by the screw of the injection molding machine when processing the polyester molding compositions into a shaped article.

(d) The polyester is fused together with the copolymer, appropriately under nitrogen. After fusing the mixture is intensively stirred, optionally in vacuo.

(e) The polyester granules are treated with a solution of the copolymer, for example in benzene or toluene, in a rotating vessel. The solvent is evaporated off whilst rolling, in the course of which the polyester granules are coated with a film of the copolymer. Mixing is effected by the screw of the injection molding machine when processing the polyester molding composition into a shaped article.

The polyester molding composition appropriately contains nucleating agents which are known to increase the speed of crystallization of the polyester composition and ensure that the polyester shaped article reaches a good degree of crystallisation. Finely divided inorganic substances which are insoluble in the polyester molding composition, such as calcium carbonate, aluminium silicates or talc and the like may be used as nucleating agents in a known manner.

The addition of the nucleating agent may be effected at various points of the process of manufacture of the polyester molding composition. Thus for example the nucleating agent may be added during the manufacture of the starting polyester, in the course of the polycondensation. It is also possible to admix the nucleating agent to the polyester together with the copolymer. It is furthermore possible to roll the granulated polyester molding composition with the nucleating agent and optionally fuse it in an extruder, extrude it whilst cooling and again granulate it.

The polyester molding composition should contain as little moisture as possible, preferably less than 0.01% by weight. In order to keep the moisture uptake low, the granulated polyester molding composition may be coated with a coating of an inert hydrophobic substance such as for example paraffin or wax.

The polymer mixtures according to the invention may be thermoplastically processed into shaped articles which are distinguished by increased impact strength. In order to obtain shaped articles having a good degree of crystallinity the mold temperature must lie sufficiently above the second-order transition temperature of the polyester employed. The shaped articles obtained from the molding compositions manufactured according to the invention are distinguished by particularly high impact strength whilst having good surface hardness, good solvent resistance and low moisture uptake.

The following examples serve to illustrate the invention, but they are not intended to limit it thereto.

EXAMPLE 1

3.88 g. of polyethylene terephthalate (reduced specific viscosity dl./g. 0.85, measured in a 1% strength solution in phenol-tetrachlorethane, 60:40, at 25° C.) were stirred for 1 hour at 280° C. and 0.1 mm. Hg. The melt was covered with dry nitrogen. 120 g. of a copolymer of ethylene and vinyl acetate, in which the proportion of vinyl acetate was 33% by weight and the average molecular $\overline{M}w$ was 200,000 were then added to the melt. The mixture was intensively stirred for 15 minutes at 275° C. and at a pressure of 0.2 mm. Hg. 3.50 kg. of the granulated polyester molding composition were rolled for 1 hour at 100° C. and at a pressure of 0.3 mm. Hg in a rotational evaporator, and then rolled for half an hour at 150° C. and 0.3 mm. Hg and finally for 7 hours at 240° C. and 0.3 mm. Hg. The product was allowed to cool under nitrogen. It was then rolled for 2 hours under nitrogen with 0.7 g. of aluminium silicate powder (47% $SiO_2$ and 38% $Al_2O_3$) (75% of the particles less than $2\mu$), and was thereafter rolled for 3 hours at 90° C. with 14.0 g. of paraffin (drop point 56° C.).

Sheets of dimensions 60 x 60 x 1 mm., having good dimensional stability, were injection molded from the resulting material at a mold temperature of 150° C.

The impact strength of the sheets was tested by a drop test. Herein, the test sheets were exposed to an impact stress by allowing a falling body sliding on low-friction tracks to drop vertically from various heights on to a sheet clamped in a frame. The tip of the dropping hammer represented a hemisphere having a radius of 10 mm. 10 sheets were tested for each height.

In a comparison experiment, polyethylene terephthalate was treated as described above, but with the difference that no copolymer of ethylene and vinyl acetate was added. The results of the drop test are summarised in Table 1.

EXAMPLE 2

3.96 kg. of a polyethylene terephthalate granular material (reduced specific viscosity 0.93 measured in a 1% strength solution in phenol/tetrachlorethane, 60:40, at 25° C.; amorphous) were rolled in a rotational evaporator for 2 hours at 100° C. and at a pressure of 2 mm. Hg, then for half an hour at 150° C. and at a pressure of 0.2 mm. Hg and finally for 5 hours at 240° C. and at a pressure of 0.2 mm. Hg. The product was allowed to cool under nitrogen and was then rolled for 2 hours with 8.0 g. of Al silicate as in Example 1. Thereafter the granules were rolled for 3 hours at 180° C. with 40 g. of a copolymer of ethylene and vinyl actate having a proportion of vinyl acetate of 33% by weight and a mean molecular weight $\overline{M}w$ of 250,000. Sheets of dimensions 60 x 60 x 1 mm. were injection molded from the resulting polyester molding composition at a mold temperature of 150° C.

Microtome sections were produced from the molding composition and these were extracted for several hours with boiling toluene in a Soxhlet. No copolymer was found in the extract.

In a comparison experiment, polyethylene terephthalate was treated as described above, but with the difference that rolling was not carried out with a copolymer of ethylene and vinyl acetate but with 16 g. of paraffin at 90° C. The results of the drop test are summarised in Table 1.

EXAMPLE 3

2 kg. of polyethylene terephthalate powder having a reduced specific viscosity of 1.5 (measured in a 1% strength solution in phenol/tetrachlorethane, 60:40, at 25° C.), having a particle size distribution of 100–750$\mu$, were mixed with 50 g. of a copolymer of 50 parts of ethylene and 50 parts of vinyl acetate having an average molecular weight $\overline{M}w=300,000$, homogenized in an extruder (cylinder dwell time 1.5 minutes; 36 screw revolutions per minute) and subsequently granulated. Further processing and testing as in Example 1. Drop test, Table 1.

EXAMPLE 4

The procedure of Example 3 is followed but 40 g. of a copolymer of 72 parts of ethylene and 28 parts of vinyl acetate, having a mean molecular weight $\overline{M}=250,000$, are employed.

TABLE 1

| Polyester | Copolymer admixed from example— | Amount added, percent by weight | Drop height F, 20 [1] cm. |
|---|---|---|---|
| Polyethylene terephthalate | 1 | 3 | 120 |
| Polyethylene terephthalate (Example 1) | | | 35 |
| | 2 | 1 | 110 |
| Polyethylene terephthalate | | | 50 |
| | 3 | 2.5 | 165 |
| | 3 | 2 | 130 |

[1] Height, at which the impact energy sufficed to produce fracture in 20% of the sheets.

We claim:
1. Thermoplastic molding compositions consisting essentially of a mixture of (a) linear saturated polyesters consisting essentially of terephthalic acid esters of diols selected from saturated aliphatic diols and cyclohexane 1,4-dimethylol, said polyesters having a reduced specific viscosity of 0.6 to 2.0 as measured at a 1% concentration in a 60:40 mixture of phenol and tetrachloroethane at 25° C. and (b) from 0.05 to 20% by weight, based on the total weight of the mixture, of copolymers of alpha-olefins of 2 to 4 carbon atoms and vinyl esters of saturated aliphatic monocarboxylic acids of 2 to 13 carbon atoms, containing from 30% to 99% by weight of units derived from the olefin, said copolymers having mean molecular weights in the range 10,000 to 500,000.

2. Thermoplastic molding compositions as claimed in claim 1, which contain as linear saturated polyester polyethylene-glycol terephthalate.

3. Thermoplastic molding compositions as claimed in claim 1, which contain as linear saturated polyester polycyclohexane1,4-dimethylol-terephthalate.

4. Thermoplastic molding compositions as claimed in claim 1, wherein the polyester contains, in addition to terephthalic acid, other aromatic or aliphatic dicarboxylic acids.

5. Thermoplastic molding compositions as claimed in claim 1, wherein the copolymer of α-olefins and vinyl esters of saturated aliphatic monocarboxylic acids is added to the polyester in an amount ranging from 0.5 to 10% by weight.

6. Thermoplastic molding compositions as claimed in claim 1, wherein the copolymer contains ethylene as the α-olefin.

7. Thermoplastic molding compositions as claimed in claim 1, wherein the copolymer contains vinyl acetate as the vinyl ester of saturated aliphatic monocarboxylic acids.

8. Thermoplastic molding compositions as claimed in claim 1, wherein the copolymer contains ethylene in an amount of from 50 to 75% by weight.

9. Thermoplastic molding compositions as claimed in claim 1, wherein the copolymer has a mean molecular weight of from 50,000 to 300,000.

10. Thermoplastic molding compositions consisting essentially of a mixture of (a) linear saturated polyesters consisting essentially of terephthalic acid esters of diols selected from saturated aliphatic diols and cyclohexane 1,4-dimethylol, said polyesters having a reduced specific viscosity of 0.6 to 2.0 as measured at a 1% concentration in a 60:40 mixture of phenol and tetrachloroethane at 25° C. and (b) from 0.05% to 20% by weight, based on the total weight of the mixture, of a copolymer of the general formula

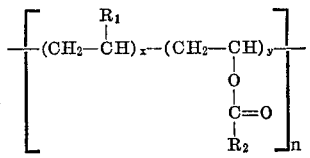

in which $x$, $y$ and $n$ are integers, $R_1$ is hydrogen, methyl or ethyl, $R_2$ is an alkyl radical of 1 to 12 carbon atoms, and the copolymer has a mean molecular weight of 10,000 to 500,000 and from 30% to 99% by weight of the units

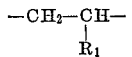

11. A molding composition according to claim 10 wherein said copolymer is a copolymer of ethylene and vinyl acetate.

References Cited

UNITED STATES PATENTS

| | | | |
|---|---|---|---|
| 2,947,718 | 8/1960 | Rugg et al. | 260—897 |
| 3,029,230 | 4/1962 | Srauss | 260—87.3 |
| 3,248,359 | 4/1966 | Maloney | 260—41 |
| 3,290,411 | 12/1966 | Tsuji et al. | 260—873 |
| 3,361,852 | 1/1968 | Bassett et al. | 260—897 |
| 3,445,546 | 5/1969 | Pledger | 260—897 |

FOREIGN PATENTS

| | | |
|---|---|---|
| 1,182,820 | 12/1964 | Germany. |
| 1,054,303 | 1/1967 | Great Britain. |
| 6,511,744 | 2/1967 | Netherlands. |

WILLIAM H. SHORT, Primary Examiner

M. GOLDSTEIN, Assistant Examiner

U.S. Cl. X.R.

117—100